Aug. 9, 1966 D. H. WINTER 3,265,142
INTEGRATED PROPULSION AND CONTROL SYSTEM
FOR AIR CUSHION VEHICLE TYPES
Filed May 3, 1962 3 Sheets-Sheet 1
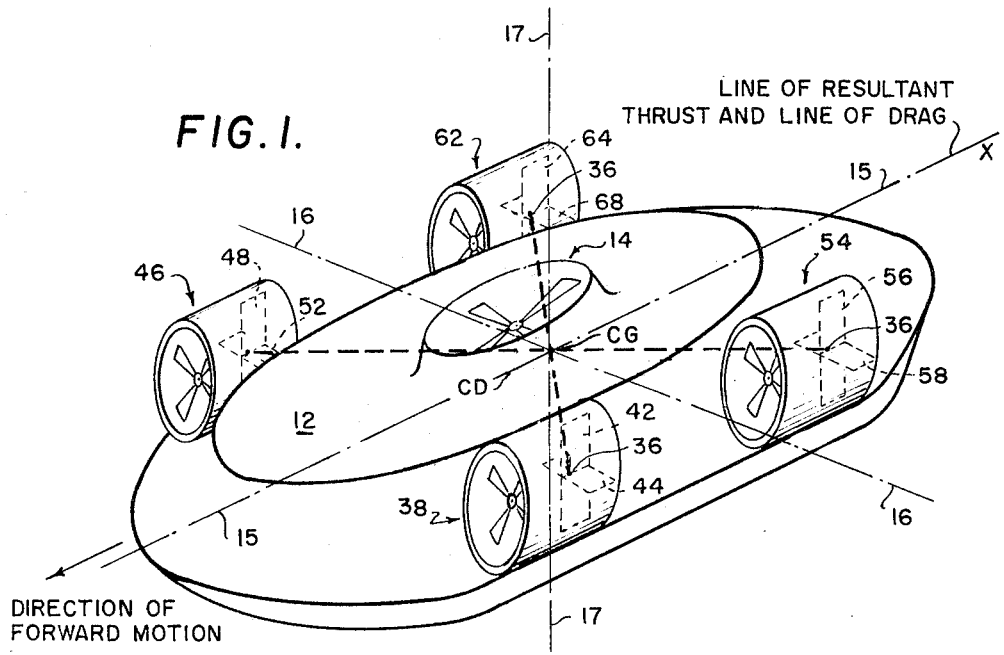
FIG. 1.
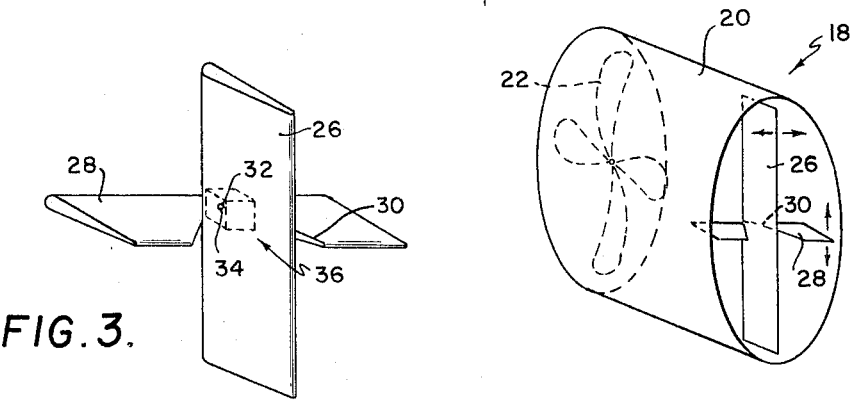
FIG. 3.
FIG. 2.
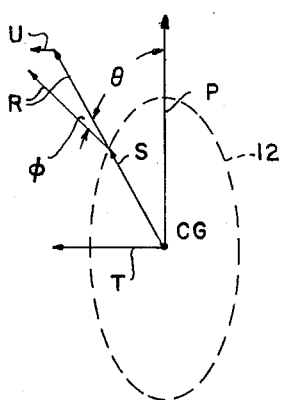
FIG. 6.
INVENTOR
DAVID H. WINTER
BY
Albert Sepp
AGENT

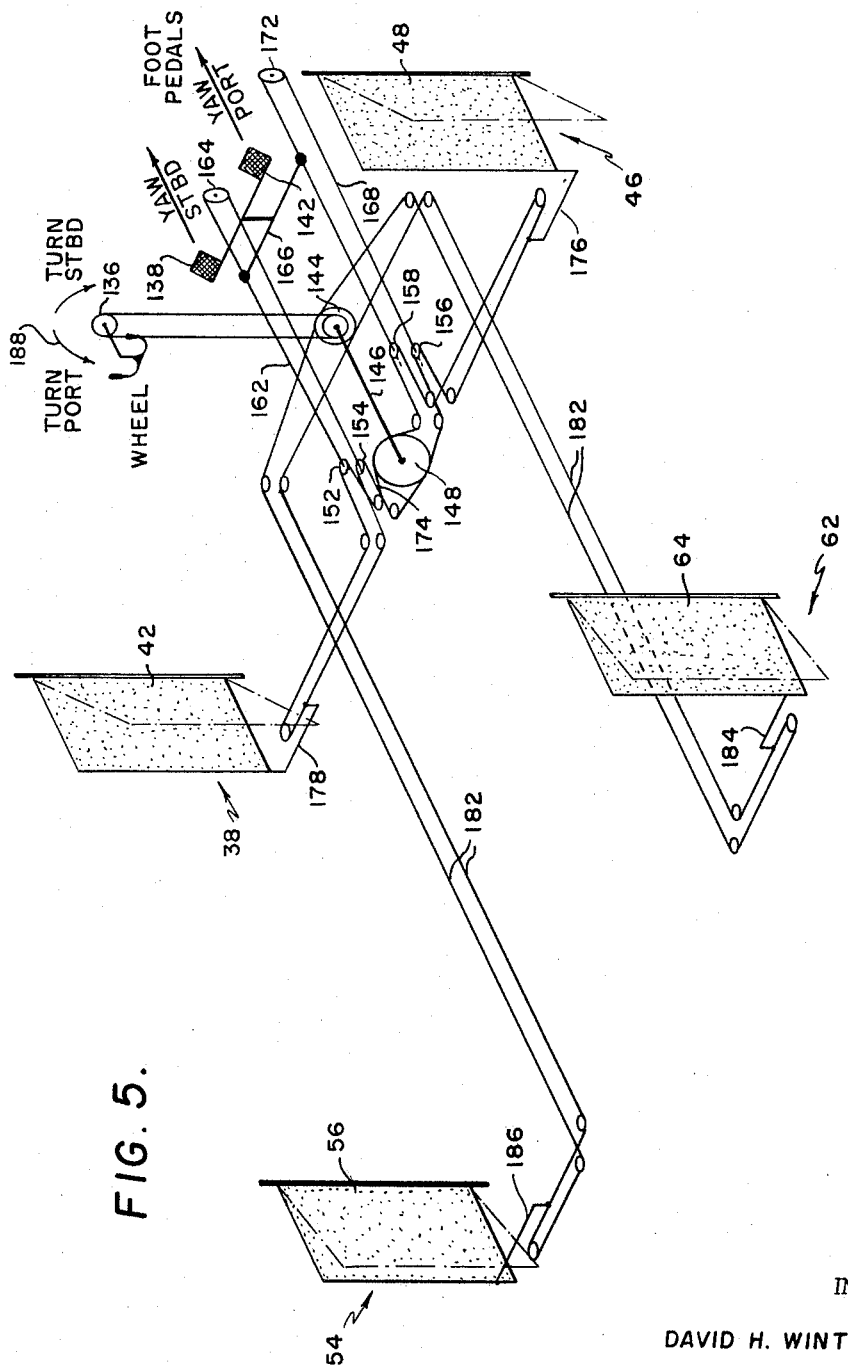

United States Patent Office 3,265,142
Patented August 9, 1966

3,265,142
INTEGRATED PROPULSION AND CONTROL SYSTEM FOR AIR CUSHION VEHICLE TYPES
David H. Winter, Silver Spring, Md., assignor to the United States of America as represented by the Secretary of the Navy
Filed May 3, 1962, Ser. No. 192,292
6 Claims. (Cl. 180—7)

The invention described herein may be manufactured and used by or for the Government of the United States of America for governmental purposes without the payment of any royalties thereon or therefor.

This invention relates to an integrated propulsion and control system for vehicles of the air cushion type, and more particularly to an integrated control and propulsion system wherein the vehicle-propelling high-energy air thrust is adjustably diverted to control the motion of the vehicle.

The problems of controlling an air cushion or ground effect vehicle is unlike that of controlling free-flight aircraft. In a free-flight aircraft, for example, where it is desired to change the heading of the aircraft, the aircraft may be rolled into a bank by means of ailerons to obtain the necessary lateral turning force. But an air cushion vehicle cannot be sufficiently banked to permit turning because the clearance between the bottom periphery of the air cushion vehicle and ground (or water) is too small. Consequently, an air cushion vehicle must be turned without obtaining a side force from banking.

A difficulty, therefore, in the control of an air cushion vehicle is to carry out control functions without incurring simultaneous coupling between desired single degrees of motion, for example, between turn and bank, or bank and turn, forward trim and dive, etc. As an illustration, in an air cushion vehicle, it may be desirable to heel the vehicle without causing a turn, turn the vehicle without causing a bank, trim without a dive, etc., and more generally to orient the vehicle with one degree of movement without coupling with another degree of movement.

Accordingly, it is an object of the present invention to provide control of an air cushion vehicle in any one of the six degrees of motion without a coupling effect with another degree of motion.

Another object of this invention is to provide a control in an air cushion vehicle for the direction of horizontal thrust within practical limits without acquiring appreciable coupled rotation in any direction.

Yet another object of this invention is the provision of a control in an air cushion vehicle for the magnitude of horizontal thrust within practical limits without incurring any appreciable coupled rotation in any direction.

Another object of the present invention is to provide a control in an air cushion vehicle for rotation of the vehicle in any direction without incurring any appreciable coupled rotation in any other direction or without incurring any coupled translation of the vehicle.

According to the present invention, in an air cushion vehicle, the line of total forward thrust is made to coincide with the line of total drag, a substantially equal portion of the total thrust being divertable at locations on the body of the vehicle symmetrical about the center of gravity and equi-distant therefrom. With the above arrangement according to the invention there is no appreciable coupling between a desired type or degree of motion and another type or degree of motion of the vehicle.

The foregoing and other objects of the present invention will be better understood by referring to the accompanying drawings in which like reference numerals indicate like parts, and in which:

FIG. 1 is a view in perspective of a ground effect vehicle having an integrated propulsion and control system according to the invention;

FIGS. 2 and 3 are cutaway views in perspective of propulsion units according to the invention;

FIGS. 4 and 5 are illustrative diagrams of an embodiment of a control system of the invention; and FIG. 6 is an explanatory vector diagram according to principles of the invention.

Figure 4:
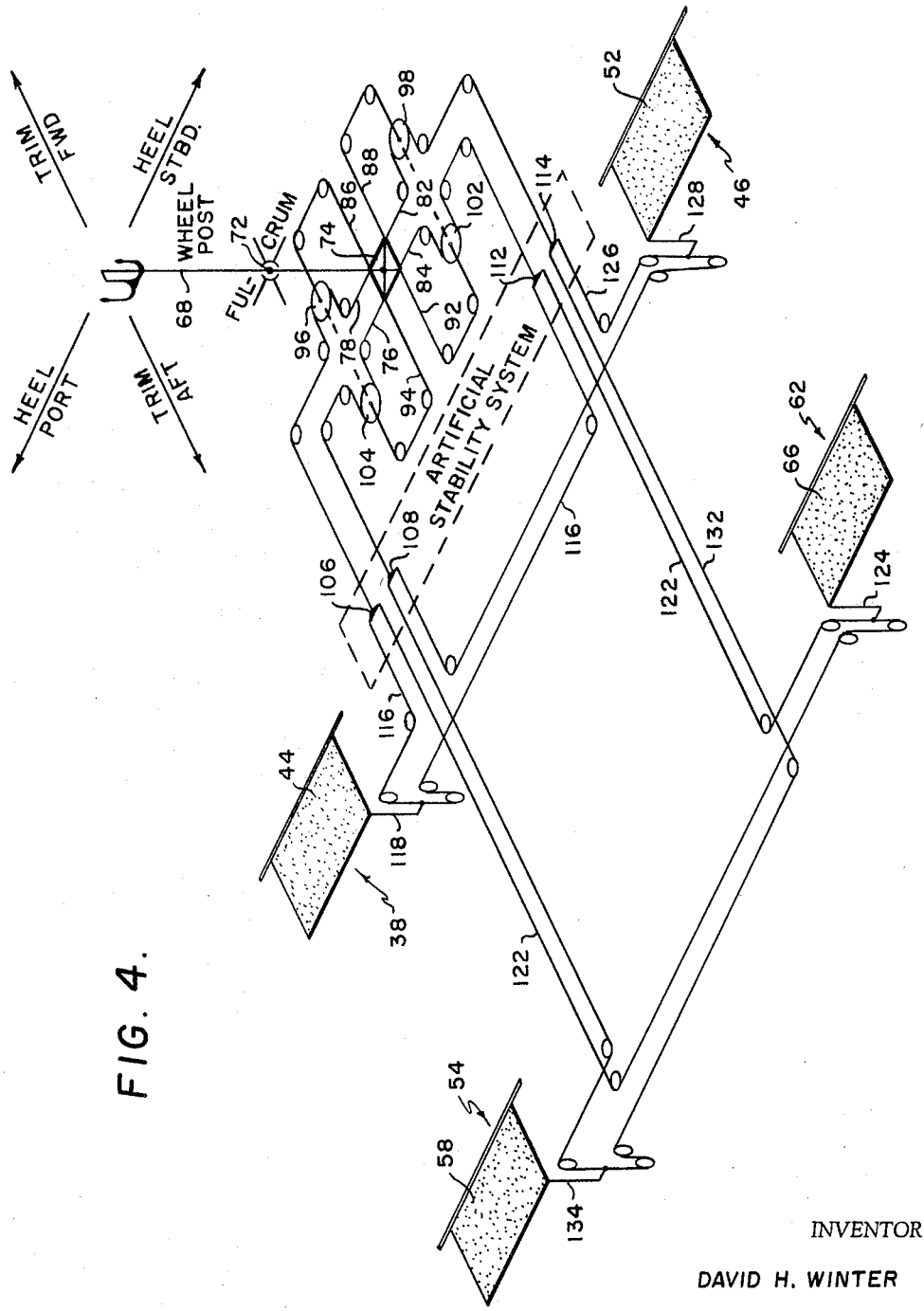

Referring to FIG. 1, an air cushion vehicle 12 may be provided with any suitable air compressor such as a ducted fan 14 shown located in the center portion of the body of the vehicle. The ducted fan 14 is fluidly coupled in a well-known manner by means of interior diffuser passages to nozzles (not shown) located in the underside of the vehicle for the downward discharge of air. According to well-known principles, the downwardly discharged air produces a region of higher than atmospheric pressure beneath the vehicle. The resulting air cushion supports the vehicle.

The vehicle 12 has a longitudinal axis 15, a transverse axis 16, a vertical axis 17, and a center of gravity CG. The vector CDX represents the line of drag when the vehicle is moving. The particular shape and size of the vehicle 12 is not critical to the invention, the vehicle being illustrated in a simple form for convenience in describing the invention. Moreover, any suitable configuration of nozzles or other suitable means may be used to produce the supporting air cushion for the vehicle 12.

Propulsion means comprising four identical propulsion units are mounted rigidly on the outside of the body of the vehicle 12. FIG. 2 is a cutaway perspective view of one of the identical propulsion units 18, each providing substantially the same amount of propulsive thrust. The propulsion unit 18 is in the form of a right circular cylindrical duct 20 open at both ends for air intake and exhaust respectively. A fan 22 driven by any suitable motor (not shown) in the duct is rotatably mounted in the forward end of the duct 20. Each propulsion unit comprises a thrust deflection means in the specific form of a rudder control vane 26 and an elevator control vane 28. Each of the vanes 26 and 28 is rotatably mounted in the rear of the duct 20, and mutually bisect each other. Each duct 20 fluidly couples its associated thrust deflection means to its associated fan 22. The rudder control vane 26 swings within a sector of about 90 degrees or less formed by a triangular slit 30 located in the center of the elevator control vane 28. The details of construction of the mountings of the control vanes 26 and 28 are not illustrated inasmuch as means for adjustably positioning surfaces such as elevators and rudders are well-known in the art. When moved, the control vanes 26 and 28 will deflect rearwardly moving high velocity air produced by the fan 22 according to their aerodynamic characteristics.

In the embodiment of the invention shown in FIG. 1, the propulsion units are mounted on the vehicle body so that the resultant line of thrust of all the propulsion units coincides with the line of drag, CDX, of the vehicle 12 when underway. Moreover, each of the propulsion units is located in a quadrant of the vehicle 12 symmetrically, in one plane, about the vehicle center of gravity CG. The distance of each propulsion unit from the center of gravity CG is measured from the combined origins 32 and 34 respectively of the vectors representing the aerodynamic forces (e.g. lift, drag) acting on the rudder and elevator control vanes 26 and 28. This common origin is not necessarily a geometrical point but is usually an irregular three-dimensional region representatively indicated in FIG. 3 by the box 36. In the embodiment shown in FIG. 1, the center of gravity CG is shown coinciding with the line of drag CDX. However, the center of gravity may be located in the vertical plane of the line of drag CDX or in coincidence with the line of drag, CDX.

The origins 32 and 34 of the aerodynamic force vectors for each of the respective control vanes 26 and 28 may be said to move independently according to the aerodynamic characteristics and angle of attack of each control vane. Generally speaking, as the control vanes 26 and 28 are moved, each of the origins 32 and 34 will move chordwise within the physical confines of each respective control vane. In practice, the measurement from each of the identical propulsion units 18 to the center of gravity CG is made from the center of the irregular region representatively indicated by the box 36.

The locations of each of the identical propulsion units 18 on the body of the vehicle 12, along with their respectively associated rudder and elevator control vanes, are indicated in FIGS. 1, 4 and 5 as left front unit 38 with rudder 42 and elevator 44; right front unit 46 with rudder 48 and elevator 52; left rear unit 54 with rudder 56 and elevator 58, and right rear unit 62 with rudder 64 and elevator 66. Thus according to the invention the distance of the center of the region 36 of each of the units 38, 46 54 and 62 to the center of gravity CG is the same, and in the embodiment of FIG. 1, the units are disposed symmetrically about the longitudinal and transverse axes passing thru the center of gravity CG. The center of thrust of each unit is at a height equal to the vertical height of the vehicle's line of drag, CDX.

With the foregoing arrangement according to the invention the total undeflected propulsive line of thrust of all of the units is directed horizontally at least approximately in line with the line of drag CDX, so that there is no thrust force tending to roll or pitch the vehicle. A desired deflection of the elevator control vanes will orient the vehicle into forward or aft trim or combinations thereof with heel alone. But the only forces tending to hold the vehicle in the maneuvered position will be the aerodynamic forces acting on the elevator control vanes and not forces arising from an induced moment about the center of gravity or from free stream effects on the vehicle 12.

Since the aerodynamic forces acting on the control vanes are symmetrical about the vehicle's center of gravity, CG, a deflection of the elevator control vanes, for example, to produce a heeling of the vehicle, does not produce a moment about the center of gravity which would cause the vehicle to rotate about the vertical axis 17 (assuming the thrust of the units to be equal). Conversely, a deflection of the rudder control vanes to produce a rotation about the vertical axis 17 or a combined rotation and translation (e.g. a turn) does not require a heeling of the vehicle to counter the centrifugal force because the aerodynamic forces acting on the vanes produce the necessary counter force, thus permitting a flat turn.

A suitable embodiment of a control system for controlling the movements of the rudders and elevators is shown in the illustrative diagrams of FIGS. 4 and 5, reference now being made to the elevator control system of FIG. 4. The four elevators 44, 52, 58 and 66 are shown connected through a series of cables to a control stick 68 which may be moved back and forth, from side to side or in combined sidewise and back and forth movement to carry out the trim and heel controls, or combinations thereof, as indicated by the legends. The control stick 68 rotates about a fulcrum 72 to move a control block 74 oppositely to the movements of the upper part of the control stick 68.

A pair of heel port cables 76 and 78 are suitably connected to the left side of the block 74; and a pair of starboard heel cables 82 and 84 are connected to the right side of the block 74. A pair of forward trim cables 86 and 88 are connected to the front of the block 74; and a pair of aft trim cables 92 and 94 are connected to the rear of the block 74. A pair of forward trim sheaves 96 and 98 are connected at their axles to the forward trim cables 86 and 88, and a pair of aft trim sheaves 102 and 104 are connected at their axles to the aft trim cables 92 and 94, both said pairs of sheaves being movable back and forth by the trim cables according to the movement of the block 74.

The heel port cables 76 and 78 are wound about the sheaves 104 and 96 respectively, the cable 78 being connected to a movable control plate 106 and the cable 76 being connected to a movable control plate 108. The heel starboard cables 82 and 84 are passed in a similar manner through the starboard sheaves 98 and 102 to starboard control plates 112 and 114 respectively. A control cable 116 connected to the control plate 106 is led through several suitably arranged fixed guide pulleys to a control arm 118 for movement of the left front elevator 44 and is returned through further suitably arranged fixed pulleys to the control plate 112. Another control cable 122 is led in a similar manner from the control plate 106 to a control arm 124 for movement of the right rear elevator 66 and is returned to the control plate 112.

From the starboard control plate 114 a control cable 126 is led via fixed guide pulleys to a control arm 128 for the right front elevator 52 and is returned to the control plate 108. In a similar manner a control cable 132 is led from the plate 114 through a series of suitably arranged fixed guide pulleys to a control arm 134 for movement of the left rear elevator 58 and is returned to the control plate 108.

To position the vehicle 12 into one of the trim positions, say, aft trim, the control stick 68 is pulled back by the operator causing the sheaves 96, 98, 102 and 104 to be moved aftwards by pulling on the cables 92 and 94 and slackening on the cables 86 and 88. Control plates 106 and 114 will be moved aftwardly and control plates 108 and 112 will be moved forwardly, the plate 112 taking up the slack of the cables 116 and 122, and the plate 108 taking up the slack of the cables 126 and 132.

The resulting aftward movement of the cables 116 and 126 lowers the positions of the control arms 118 and 128 so that the trailing edges of the forward elevators 44 and 52 are lowered. An upward direction of movement takes place in the trailing edges of the rear elevators 58 and 66 due to forwardly moving cables 122 and 132. The result is that the upwardly inclining or tilting forward elevators 44 and 52 of the propulsion units 38 and 46 cause the vehicle 12 to nose up, and the downwardly inclining rear elevators 58 and 66 of the propulsion units 54 and 62 cause the after end to rear down, thereby achieving a trim aft position. In the case of forward trim, the opposite elevator movement takes place.

To produce a starboard heel, the control stick 68 is moved to the right side of the vehicle pulling control plates 112 and 114 forward and therefore elevators 52 and 66 upward. Control plates 106 and 108 are moved rearwardly thus dropping elevators 44 and 58, the overall result being that raised elevators 52 and 66 in the ducted airstream of the propulsion units 46 and 62 force the right side of the vehicle 12 down while the lowered elevators 44 and 58 of propulsion units 38 and 54 force the left side of the vehicle 12 up, thereby producing a starboard heel. Of course, a port heel is produced in an opposite manner, and combinations of heel and trim may be produced by moving the control stick 68 to positions intermediate cardinal directions thereof.

Referring to FIG. 5 which shows the rudder control system, the rudder movements are generated by turning a wheel 136 mounted on the control stick 68 and by operating left and right footpedals 138 and 142 respectively. It is to be understood that by merely deflecting the rudder control vanes 42, 48, 56 and 64 in the same direction and to the same degree, only purely translational movement of the vehicle 12 would take place. If the forward rudder control vanes 42 and 48 were deflected in the same angular degree but in the opposite angular direction from the rear rudder control vanes 56 and 64, the vehicle 12 would merely spin about its center of gravity without turning because there would not be the requisite translational force for producing a turn. Consequently to produce a turn it is necessary to add a yawing moment to the translational forces acting on the vehicle by virtue of the deflected rudders. As will be seen from the following, this yaw is produced by automatically deflecting the forward rudders 42 and 48 at a greater rate than the rear rudders, or instead by adding an angle of deflection (yaw) to the forward rudders by operating the foot pedals 138 and 142.

The steering wheel 136 is connected by means of a pulley to a control wheel 144 rigidly mounted on the forward end of a shaft 146 for rotation therewith. A high rate control wheel 148 of larger diameter than wheel 144 is mounted on the aft end of the shaft 146 for rotation therewith so that the steering wheel 136 turns both control wheels 144 and 146 in the same direction therewith.

A pair of longitudinally movable port sheaves 152 and 154 and starboard sheaves 156 and 158 are positioned on opposite sides of the high rate control wheel 148. The port sheaves 152 and 154 are connected at their axles to the ends of a control cable 162 which is wound around a fixed guide pulley 164 and is movable back and forth by a pedal control arm 166 movable in unison with the left foot pedal 138. When the left pedal 138 is moved forward, the sheave 152 will be moved forward by the control cable 162 while the sheave 154 will be moved aftward.

In a manner similar to that described in conjunction with the port sheaves 152 and 154, the starboard sheaves 156 and 158 are connected to the ends of a control cable 168 wound around a suitably located fixed guide pulley 172 for movement back and forth by the right foot control pedal 142 oppositely to movements of the left control pedal 138.

A control cable 174 is wound around a suitably arranged fixed guide pulley located near each front rudder and is connected to a control arm 176 for moving right front rudder 48 and a control arm 178 for moving left front rudder 42.

More specifically, the control cable 174 is held in intimate contact with the upper periphery of the high rate control wheel 148 by any suitable arrangement of guide pulleys disposed adjacent thereto; and the cable 174 passes around the outer port sheave 152 tending to draw the sheave aftward. The cable 174 is then passed around a suitably located fixed pulley adjacent left front rudder 42 and is attached to the left front rudder control arm 178. The control cable 174 then passes in tension relationship around the inner port sheave 154 and then in intimate contact with the lower periphery of the high rate control wheel 148 for movement thereby, the cable emerging from the lower periphery being passed through suitably arranged guide pulleys and then in tension relationship around the outer starboard sheave 156.

The right front rudder control arm 176 is suitably attached to the cable 174 for movement thereby, the cable 174 passing around a fixed pulley and then in tension relationship around the inner starboard sheave 158 to the upper periphery of the high rate control wheel 148.

A control cable 182 for adjustably positioning the rear rudders 56 and 64 is held in intimate contact with the upper and lower peripheries of the forward control wheel 144 by means of suitably located guide pulleys. The cable 182 passes from the upper periphery of the wheel 144 through suitable fixed pulleys to a right rear rudder control arm 184, and thence through another suitably arranged set of fixed pulleys past the lower periphery of the wheel 144 and back to a left rear rudder control arm 186. The cable 182 is returned through pulleys to the upper periphery of wheel 144.

To execute a turning movement to port, for example, the steering wheel 136 is rotated counterclockwise as shown by the arrow 188, thus rotating both control wheels 144 and 148 counterclockwise. Because of the larger diameter of the high rate control wheel 148, the forward rudder control cable 174 is displaced at a higher rate than the rear rudder control cable 182. Thus, for a given amount of rotation of the steering wheel 136, the rear rudders 56 and 64 are angularly displaced to a lesser degree in the same direction of rotation than the forward rudders 42 and 47. The resulting angular positions of the rudders is shown by the dotted lines in FIG. 5.

Instead of producing the necessary yaw by means of the high rate control wheel 148, more conventional type pilot control may be had by providing both the control wheels 144 and 148 of the same diameter. In this instance the pilot would introduce the necessary yaw by operating the foot pedals 138 and 142. For example, in the foregoing example of the turn to port, but with wheels 144 and 148 being of the same diameter, a counterclockwise rotation of the steering wheel 136 would move all of the rudders in the same direction to the same angular displacement, thereby producing only side forces. The pilot, by pushing the right pedal 142 forward would cause sheaves 154 and 158 to move forward, and sheaves 156 to move rearward, thereby moving the forward rudder control cable 174 at its point of connection to the control arms 176 and 178 an additional amount to the right of the vehicle. As a result, the forward rudders 42 and 48 would be rotated an additional amount counterclockwise to thereby reach the dotted line positions thereof shown in FIG. 5 to produce a turning movement to port.

Of course, it is understood that other yawing and turning movements may be carried out in addition to the foregoing illustrative examples by singly or combinedly operating the steering wheel 136 and the foot pedals 138 and 142. For example, yaw alone may be introduced by operating the pedals 138 and 142; and translation alone may be carried out in the instance where large diameter control wheel 148 is provided, by operating the pedals 138 and 142 to produce reverse yaw to cancel out the increased rotation of the forward rudders 42 and 48. Where wheels 144 and 148 are of the same diameter, a simple rotation of the steering wheel 136 will produce translation. Of course, the elevator and rudder control systems shown in FIGS. 4 and 5 may be operated simultaneously.

The vector diagram of FIG. 6 illustrates the forces acting on the vehicle 12 by virtue of the novel control system of the present invention. In FIG. 6, the vector P represents the forward propulsive thrust of the vehicle. When all of the rudder control vanes are rotated in the same direction to the same angular displacement $\theta$, a sidewise (translational) force resulting from forward rudder deflection represented by the vector R, and from rear rudder deflection represented by the vector S, act on the resultant forward propulsive thrust vector P to produce the resultant purely lateral vector component T. An additional yaw vector U produced by a further rotation of angle $\phi$ of the forward rudders 42 and 48 (either by operation of the pedals 138 and 142 or by virtue of the high rate control wheel 148) introduces a rotation about the center of gravity CG. Thus, the combined translational and rotational forces necessary to result in a turn are produced.

In that practically all of the vehicle-moving controlling aerodynamic forces are introduced by virtue of the rudder and elevator control vane arrangement according to the invention, it is naturally desirable that the vehicle 12 be designed so as to have as neutral and symmetrical an aerodynamic shape as possible. However, with use of the present invention improved control results may be obtained with any known type of air cushion vehicle despite the fact that some air cushion vehicle designs may operate less efficiently therewith than other designs.

While it may appear that some of the advantageous results of the present invention may be obtained by using movable propulsion units instead of deflectable vane elements located in fixed propulsion units, it has been found that movable propulsion units present considerable difficulties in that they are a great deal more expensive and less efficient. A movable propulsion unit system has the decided disadvantage of being greatly limited in degree of deflection for vehicle control purposes. And if each of the movable units is not perfectly balanced in all positions of movement, the center of gravity of the vehicle as a whole will be changed, thus introducing undesirable couples between degrees of motion. And still further, the drag characteristics of the vehicle will be changed due to the variation in frontal air resistance when the propulsion units are deflected.

Obviously many modifications and variations of the present invention are possible in the light of the above teachings. It is therefore to be understood that within the scope of the appended claims the invention may be practiced otherwise than as specifically described.

What is claimed is:

1. A vehicle of the type having its body supported primarily by an air cushion comprising:
   (a) four ducted fan propulsion units carried by said body;
   (b) each of said units being located on said body in a quadrant thereof symmetrically about the center of gravity of said body as seen in plan view;
   (c) the resultant line of thrust of all of said propulsion units coinciding with the line of drag of said body when in motion;
   (d) a crucifix of rudder and elevator control vanes adjustably mounted aft of the fan in each of said ducted fan propulsion units;
   (e) means connected to the rudder control vanes of said propulsion units located forwardly of the center of gravity of said vehicle for deflecting said rudder control vanes at a rate greater than the rate of deflection of the other rudder control vanes.

2. The invention as defined in claim 1 and further comprising independent control means for said rudder control vanes and for said elevator control respectively.

3. The invention as defined in claim 1 but further characterized in that the center of gravity of said body is located at least approximately in the vertical plane of the line of drag of said vehicle when in motion.

4. The invention as defined in claim 1 but further characterized in that the center of gravity and the line of drag of the body of said vehicle coincide.

5. An integrated propulsion and control system for a vehicle of the type having its body supported primarily by an air cushion comprising:
   (a) a plurality of discrete thrust propulsion means rigidly mounted on said body;
   (b) said plurality being an even number greater than three;
   (c) said propulsion means being in the form of a duct having a fan mounted in the forward end;
   (d) the resultant line of thrust of said plurality of thrust propulsion means at least approximately coinciding with the line of drag of said body when in motion;
   (e) adjustable thrust deflecting means mounted in the thrust path of each of said thrust propulsion means;
   (f) the deflecting means being mounted in said body so that the approximate origin of vector components representing aerodynamic forces acting on each of said thrust deflecting means are symmetrical in a plane about the center of gravity of said body;
   (g) said deflecting means comprising a mutually bisecting rudder control vane and an elevator control vane aft of said fan in said duct; and
   (h) further control means for deflecting said elevator control vane and means for deflecting said rudder control vane independently of said elevator control vane.

6. The invention as defined in claim 5 but further characterized by said further control means comprising rate control means for deflecting at a greater rate all of the rudder control vanes located on the body of said vehicle forwardly of the center of gravity thereof in relation to the rate of deflection of the other rudder control vanes.

References Cited by the Examiner

UNITED STATES PATENTS

| | | | |
|---|---|---|---|
| 2,953,320 | 9/1960 | Parry | 180—7 |
| 2,961,189 | 11/1960 | Doak | 244—12 |
| 2,981,501 | 4/1961 | Schaefer | 180—7 |
| 2,991,026 | 7/1961 | Nelson et al. | 244—52 |
| 3,065,929 | 11/1962 | Holland | 244—52 |
| 3,078,938 | 2/1963 | Bollum | 180—7 |
| 3,078,939 | 2/1963 | Bollum | 180—7 |
| 3,083,935 | 4/1963 | Piasecki | 244—7 X |
| 3,086,731 | 4/1963 | Beckington | 244—52 |
| 3,150,732 | 9/1964 | Walker | 180—7 |

A. HARRY LEVY, *Primary Examiner.*